United States Patent [19]

Lloyd

[11] Patent Number: 4,919,165
[45] Date of Patent: Apr. 24, 1990

[54] RAINFALL CONTROL FOR IRRIGATION SYSTEMS

[76] Inventor: Grover Lloyd, 509 W. Lee St., Osceola, Ark. 72370

[21] Appl. No.: 376,507

[22] Filed: Jul. 7, 1989

[51] Int. Cl.⁵ ............................................. F16K 17/36
[52] U.S. Cl. ................................ 137/78.2; 200/84 R; 239/65; 417/44
[58] Field of Search ................ 417/44; 200/84 R; 137/392, 78.2; 239/65

[56] References Cited

U.S. PATENT DOCUMENTS

| | | | |
|---|---|---|---|
| 1,258,679 | 3/1918 | Hedberg | 200/84 R |
| 2,981,195 | 4/1961 | Payne, II et al. | 417/44 |
| 3,212,714 | 10/1965 | Davis et al. | 137/78.2 |
| 3,422,833 | 1/1969 | Kitrilakis | 137/78.2 |
| 3,500,844 | 3/1970 | Sanner | 137/78.2 |
| 3,823,874 | 7/1974 | Kroeck | 239/65 |
| 4,059,227 | 11/1977 | Hunter | 137/78.2 |
| 4,541,446 | 9/1985 | Hogan | 137/78.2 |

FOREIGN PATENT DOCUMENTS 8909 of 1912 United Kingdom ............. 200/84 R

Primary Examiner—A. Michael Chambers
Attorney, Agent, or Firm—Dowell & Dowell

[57] ABSTRACT

An irrigation system control apparatus which includes an adjustable float switch mounted within a rain collector receptacle which switch is actuated in response to a predetermined amount of rainfall to terminate the operation of the motor and pump assembly of the irrigation system.

20 Claims, 2 Drawing Sheets

RAINFALL CONTROL FOR IRRIGATION SYSTEMS

BACKGROUND OF THE INVENTION

1. Field of the Invention

This invention is generally directed to control devices for controlling the operation of sprinkler or irrigation systems in direct response to the amount of rainfall which has occurred in the area of the sprinkler or irrigation system. More specifically, the present invention is directed to a control device for terminating the operation of a sprinkler or irrigation power supply system so as to prevent the further distribution of water through the sprinkler or irrigation system in response to a predetermined amount of rainfall being detected by the control device.

The control device of the present invention includes a receptacle in which fluid in the form of rain water is collected and wherein an electrical control switch is pivotally mounted so as to be operable by a float that is vertically movable within the receptacle in response to the accumulation of rain water therein. The switch of the present invention may be selectively vertically adjustably mounted within the receptacle so as to alter the operation of the switch to terminate the operation of the sprinkler or irrigation system depending upon a predetermined amount of rainfall which must occur before the irrigation or sprinkler system is no longer required. In addition, the control device includes structure for insuring that the electrical switch is not adversely effected by the accumulation of water within the receptacle and provides positive discharge outlets for preventing the accumulation of water beyond a predetermined volume. The control device also includes a cover and baffle for directing water relative to the electrical contacts of the control device and for preventing the accumulation of debris within the receptacle.

2. History of the Related Art

In many agricultural areas, it is often necessary to utilize some type of irrigation during the dry or hotter seasons. Many such irrigation or sprinkling systems are located in remote areas which are not easily monitored by or accessible to agricultural workers. Therefore, it is extremely important that some types of controls are provided to insure the proper operation of the sprinkling or irrigation system in the absence of any direct manual control and further to insure that such systems operate in the most efficient manner possible so as to conserve valuable water resources.

In many portions of the United States, subsurface deep well or aquifer water sources are being utilized to provide the necessary water to support proper crop growth during dry seasons or times of drought. Unfortunately, the necessary subsurface water reserves or aquifer levels often become dangerously low especially during elongated drought periods. In view of the foregoing, it is necessary to provide controls for irrigation and sprinkler systems in agricultural areas which will insure the most efficient use of water resources and which will prevent waste of water during those periods when natural rainfall is sufficient to support crop growth. Even in drought areas, sudden storms may result in significant quantities of rainfall over short periods of time. Although heavy rains often result in significant run-off which is not effective in providing the moisture to the soil to support plant growth, such storms do provide a significant amount of water which does penetrate the soil and should be accounted for in the overall watering requirements for any given crop.

In many older irrigation sprinkler systems, there was no provision for monitoring the amount of natural rainfall in order to control the amount of sprinkling or irrigating water introduced to given acreage or agricultural sites. Therefore, during those periods when sudden or unexpected storms deposited significant amounts of rain water to a given area, an excess of water was being simultaneously supplied by irrigation or sprinkler systems. Such a situation not only resulted in wasted water reserves but in some situations resulted in flooding of crops.

In view of the foregoing, there have been some prior art controls developed for sprinkling and irrigation systems which have been designed to account for natural rainfall in order to provide more efficient operation of sprinkler or irrigation systems. Unfortunately, systems developed to date have not provided the necessary reliance in control while being both economical and suitable for use in all agricultural areas. In U.S. Pat. No. 3,309,474 to Heinrich, a rainfall actuated switching apparatus is disclosed which includes a mechanically operated electrical switch which incorporates a lever mounted to a support post. One end of the lever is pivoted on one side of an axis into engagement with a push button electrical switch which makes or breaks electrical control to the motor of an irrigation or sprinkler system. A container is slideably mounted along the opposite side of the lever from the pivot point in which rain water may be received. Depending upon the placement of the container along the length of the lever, a different moment is established about the pivot point so that the weight of the water within the container may be utilized to force the first end of the lever into engagement with the electrical switch thereby effecting the control of the electrical circuit. Unfortunately, with such a system, a positive and accurate control of the electrical switch is not insured and the operation of the switch is not the same for each rainfall. Specifically, the harder the rainfall and the more dense the rain and wind during a given storm, the more quickly such an operating device would activate the switch. This is especially true if high wind gusts occur in the area which wind gusts would also serve to create pressure pushing on the container to aid in the engagement of the electrical switch by the operating lever. Further, debris in the air including fallen branches or leaves from agricultural crops can be retained within the container thereby offsetting its weight balance with respect to the electrical switch and, in some cases, causing an activation of the switch prematurely. In addition to the foregoing, such a mechanical relationship of the component parts will become less reliable over a given period of time due to the buildup of rust, dirt and other particles which will cause greater resistance of the electrical switch relative to the actuating lever and which will also result in binding of the pivot of the lever with respect to its support. Due to these shortcomings, such a control device is not suitable for use in providing an accurate and efficient control for terminating the operation of a sprinkling or irrigation system.

In U.S. Pat. No. 2,969,168 to Geiger, a misting control for cutting beds is disclosed which incorporates a lever type operating system utilizing a pivotable electrical switch. In this control device, an absorbent collector is mounted on one side of a lever and is counterbalanced by a weight on the opposite side thereof. An electrical switch is mounted along the lever and is tiltable depending upon the angle of the lever to either make or break an electrical contact to control the amount of spray being introduced to the cutting bed. As the absorbent material retains water or spray being introduced to the bed, the material will become heavier and offset the counterbalance weight. As with the structure discussed with respect to Heinrich, this type of lever balance system is not adequate for use in agricultural areas where the unit will be placed in an open field. Such a balancing type system will not be effective to regulate and accurately control the operation of the sprinkler system in response to a given amount of naturally occurring rainfall as the system is subject to being effected by debris, high wind gusts and humidity and evaporation conditions. The actuating lever may be activated or counterbalanced by tree limbs or leaves accumulatng on the absorbent material or by heavy rainfall in which the force of the falling rain is added to the quantity of rain being retained by the absorbent material. Further, in many areas where there are high humidity conditions, the absorbent pad may already retain a significant amount of moisture even though there may have been little rainfall. In view of the foregoing, such a system is not conducive for use in agricultural areas to insure that irrigation and sprinkling systems are only deactivated in response to given quantities of natural rainfall.

In U.S. Pat. No. 2,776,860, an electrical automatic sprinkling device is disclosed which utilizes a pair of solenoid operated switches which are mounted in line in vertically spaced relationship with respect to one another in a rain collector. Although this structure overcomes some of the shortcomings of the control devices discussed above, such a system is overly complex and does not provide all the safeguards which are believed necessary to insure an accurate and optimum control of an irrigation or sprinkling system in response to natural rainfall. Further, the sprinkling control device is utilized to both retain and monitor natural rain and rain being introduced through the sprinkling system. It is the purpose of the present invention to provide an automatic termination of a sprinkling or irrigation system in response to a given amount of naturally occurring rainfall. If the amount of moisture being introduced into the soil through the irrigation system is co-calculated with the amount of naturally given rainfall, then it would be necessary to subtract from the volume of liquid collected the exact amount of irrigation water being introduced to the crops to know exactly how much naturally occurring rain water had been collected within the control device. This is not the case with the present invention wherein only the naturally occurring rainfall is being monitored. Further, the device disclosed in Griffis includes an open conical receptor in which debris and other foreign materials may be collected and adversely effect the operation of the control device. Further, the collector is not designed so as to permit selective adjustment of the contact points within the collector so as to regulate the effective operation of the control circuit depending upon a wide range of amounts of natural rainfall.

Another type of rain detector for irrigation control systems is disclosed in U.S. Pat. No. 4,613,764 to Lobato. In this device, an open container or collection tray for receiving natural rainfall is provided adjacent a pair of electrical contacts which are positioned within the collection receptacle. The spaced electrical contacts or sensors are adjustable so that when a given amount of rainfall is collected within the tray, the sensors will complete a circuit to thereby control the irrigation system. With such a structure, the rain water being collected within the open tray is also subjected to the collection of debris which would give a false reading of the water volume. In addition, this type of control device subjects the controls of the irrigation system to intermittent open and closed circuit conditions especially as the level of the liquid within the collection tray approaches the sensor contacts. During a period of extremely heavy rainfall, it is possible that the contacts will make and break periodically as the rain water bridges the gap in the air space between the contacts and the liquid within the tray depending upon the liquid running from the tips of each of the contacts. In addition, high winds can cause rippling of the liquid contained within the tray which rippling can cause make and break electrical contacts. This situation could be damaging to electrical motors utilized in a sprinkler or irrigation system. It is further believed that in systems wherein there is direct electrical make/break developed by positioning electrical contacts within the rain water, that such contacts will break down or become rusted or deficient over a period of time due to the natural corrosive effect of the liquids with respect to the electrical contacts or sensors.

Another example of prior art rain or irrigation detector systems or sprinkler control includes U.S. Pat. No. 3,823,874 to Kroeck.

SUMMARY OF THE INVENTION

This invention is directed to a control device for shutting down the motor and pump assembly which powers a sprinkler or irrigation system in response to a predetermined amount of naturally occurring rainfall. The control device includes a receptacle having a float disposed therein which is vertically movable in response to an accumulation of rain water within the receptacle. A mercury type switch is mounted upon the float so as to be pivotably movable in response to the elevation of the float due to the accumulation of rain water within the receptacle. The float is mounted within the receptacle by a special bracket assembly which is secured to the receptacle so as to be selectively vertically adjustably mounted thereto thereby allowing the float to be responsive to different amounts of naturally occurring rainfall in order to regulate the amount of rainfall necessary to incur operation of the control device to prohibit further irrigation or sprinkling of an agricultural area. In a preferred embodiment of the invention, the bracket assembly is mounted through a plurality of vertically spaced openings in the side walls of the receptacle. In this manner, the spaced openings provide both a position for vertically adjustable attachment of the bracket and therefore the float assembly within the receptacle and also provide fluid outlets for discharging fluid from the receptacle after it has reached a certain level so that the level of retained liquid within the receptacle does not adversely effect the operation of the electrical switches or the conductors mounted therein which may otherwise occur if the liquid level would increase to a point above such switches In another embodiment of the invention, a dispensing valve may be incorporated with the receptacle to insure an automatic discharge of liquids therefrom once the electrical switch has been operated to disconnect or terminate the operation of the power to the motor and pump unit of the irrigation or sprayer system. The rain control device further includes a cover portion having a sieve or screen formed therein so as to trap any foreign materials from passing into the rain collection receptacle. Baffle means are also provided within the receptacle to direct incoming rain water around the electrical switch which is pivotally movable therein so that the rain water will not adversely effect the movement of the switch or the electrical contacts associated therewith. In addition to the foregoing, in some embodiments of the invention, the control unit may be supported on an independent base member which is insertable into the ground and which includes an upper bracket assembly in which the rain collection receptacle may be securely engaged.

It is a primary object of the present invention to provide a control device for terminating the operation of a motor which controls a pump of an irrigation or spraying system for agricultural areas in response to a given amount of naturally occurring rainfall so as to insure that surface and subsurface water reserves are not utilized when sufficient naturally occurring rainfall is available in the area.

It is yet another object of the present invention to provide a control device for terminating the operation of a sprinkler or irrigation system wherein the control device is responsive only to the amount of naturally occurring rainfall without being adversely effected by high winds, fallen debris, or extremly dense or heavy rainfalls.

It is yet another object of the present invention to provide an electrical control device for terminating the operation of a motor that controls a sprinkler or irrigation system wherein the control device includes a receptacle having a float operated switch contained therein which switch is screened from liquid entering into the receptacle so as to prevent water accumulation on any electrical contacts which may otherwise might interfere with the control circuitry and further wherein the electrical switch may be vertically adjustable relative to the collection container so as to selectively regulate the activation of the switch dependent upon different amounts of naturally occurring rainfall.

It is also an object of the present invention to provide a control device for terminating the operation of the motor controls to fluid sprinkling and irrigation systems which may be utilized in remote areas without the need for manual control and which will operate automatically based upon a given amount of naturally occurring rainful occurring during a given period of time.

Another object of the present invention is to provide a control device for terminating the operation of the motor controls for fluid irrigation and sprinkling systems wherein the accumulation of rain water within the receptacle is terminated after a preselected amount of rainfall has been detected and thereby prevents the additional accumulation of liquids which may otherwise adversely effect the electrical components contained therein.

DESCRIPTION OF THE PREFERRED EMBODIMENT

Figure 1:
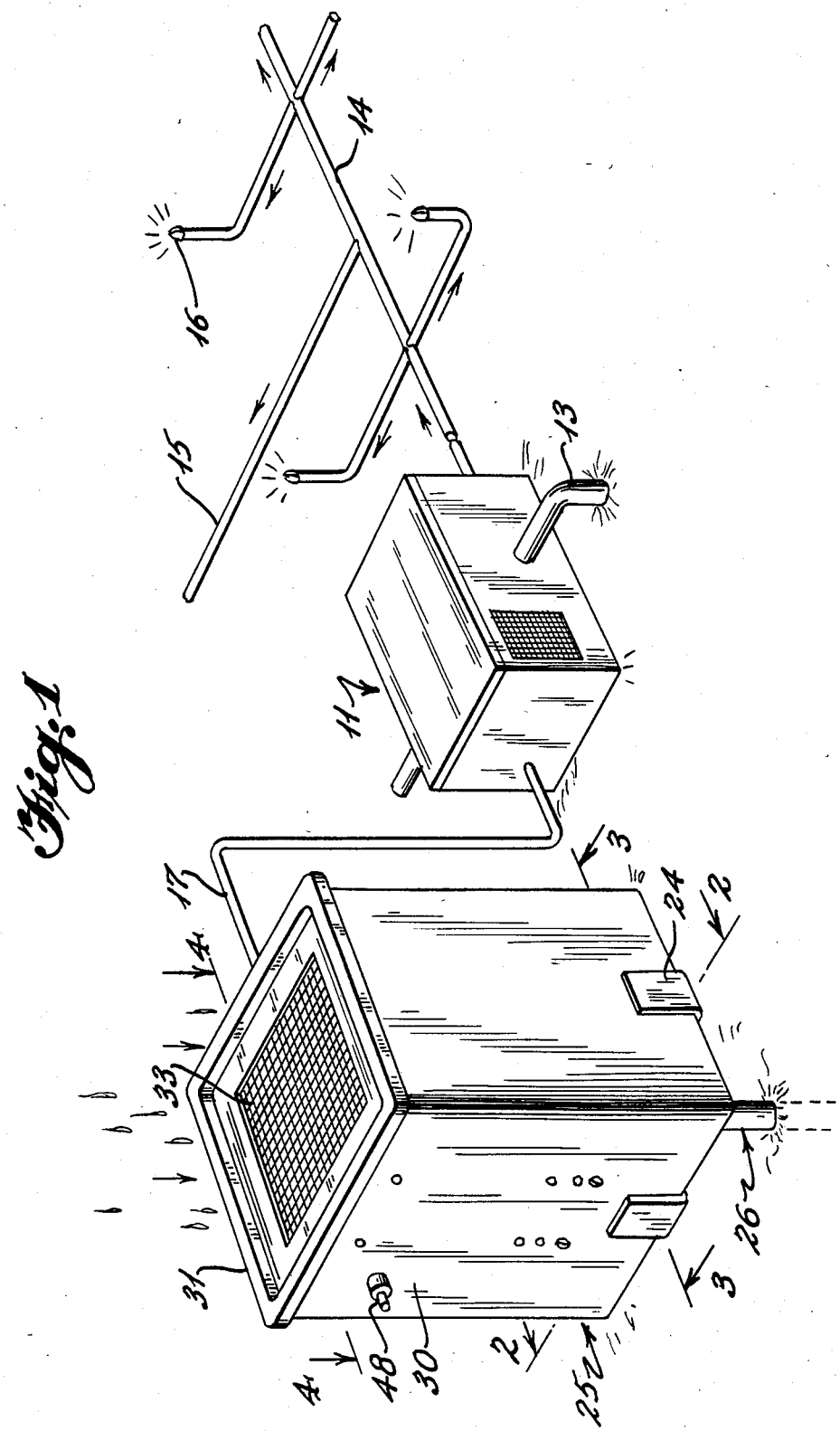
FIG. 1 is an enlarged perspective view of the present invention shown as being mounted in line with the pump and motor control assembly for an irrigation system.

With continued reference to the drawings, the irrigation control device 10 of the present invention is shown as being mounted in line with the motor and pump control unit 11 of an irrigation system 12. The irrigation system includes a well intake line 13 and main distribution line 14 and a plurality of discharge lines 15 having distribution outlets or sprayers 16. An electrical conduit 17 is provided between the control device 10 and the pump and motor control 11 in which electrical conductors are extended as will be discussed in greater detail hereinafter.

In order to provide a secure support for the control device of the present assembly with respect to the ground, a special ground inserted stand 20 is provided. The stand includes a ground engaging support 21 having a lower tapered end portion 22 which facilitates the insertion of the support into the ground and an upper end portion having a bearing element 23 secured thereto. A plurality of generally L-shaped flange elements 24 extend outwardly from the bearing 23 of the stand element and provide a bracket in which the base portion of a receptacle 25 is selectively seated.

Figure 2:
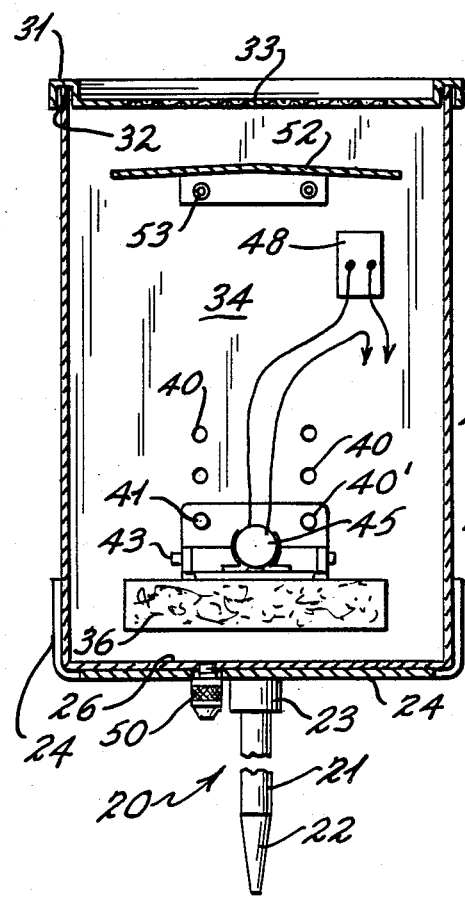
FIG. 2 is a cross section taken along lines 2—2 of FIG. 1.
Figure 3:
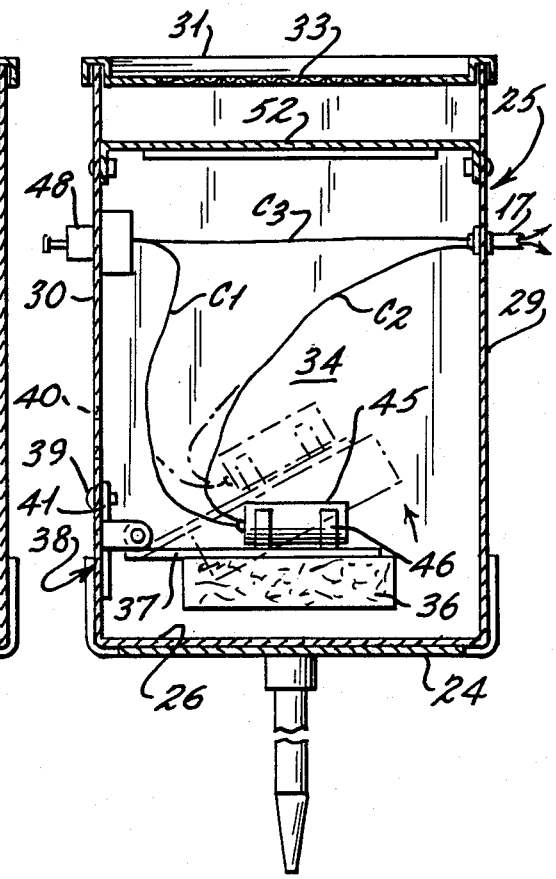
FIG. 3 is a cross sectional view taken along lines 3—3 of FIG. 1.

The rain collection receptacle 25 of the present invention is shown as including a generally rectilinear container having a bottom wall 26 and opposing side walls 27 and 28 and 29 and 30, respectively. The upper portion of the receptacle 25 is covered with a lid 31 which includes an annular U-shaped channel 32 which is seated with the upper edge of the side walls as shown in FIGS. 2 and 3 of the drawings. The central portion of the lid is provided with a sieve or strainer opening 33 through which rain may fall into the chamber 34 defined within the interior of the receptacle.

Mounted within the chamber 34 of the receptacle 25 is a float element 36 supported by a pivotable hinge plate 37 which is part of a mounting bracket assembly 38. The mounting bracket assembly is secured by fastening or securing means such as screw elements 39 which are oriented through vertically spaced pairs of openings 40 provided through the side wall 30 of the receptacle 25. The bracket assembly 38 includes a fixed base plate 41 having openings therein through which the fastening elements or screws 39 are selectively retained. A pair of flange elements 42 extend outwardly from either side of the base plate and include outer openings in which a hinge pin 43 is selectively seated. The hinge pin 43 is carried at one end of the pivotable plate 37 and allows the plate 37 to rotate vertically relative to the base 41 of the mounting bracket as shown in dotted line in FIG. 3.

An electrical fluid level monitoring switch 45 is mounted within a pair of support brackets 46 which are secured to the pivotable plate 37. A pair of conductors C1 and C2 extend from the electrical switch 45 with conductor C1 extending to a second on/off switch 48 which is mounted through one of the side walls of the housing. A third conductor C3 extends from the on/off switch 48 to the conduit 17 which extends through another side wall of the housing and to the pump and motor control unit 11. Conductor C2 extends from switch 45 directly to the conduit 17 so that conductor C2 and C3 extend in series between the motor control unit, the on/off switch and the level control switch 45.

Figure 5:
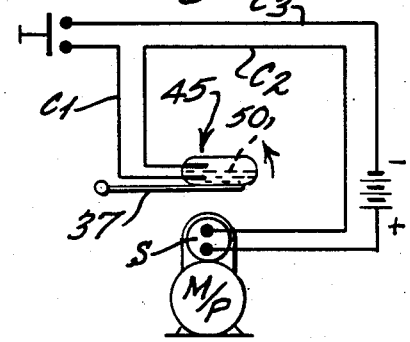
FIG. 5 is an electrical diagram showing the first and second switches of the present invention as they are electrically conducted to the motor control of the irrigation system.

With particular reference to FIG. 5, one form of electrical circuit for use with the present invention is shown In this circuit, the on/off switch 48 is in series with the fluid level switch 45 and a start/stop switch associated with the pump motor control unit 11. In the preferred embodiment, the float control switch 45 is a mercury type switch having a pool of mercury 50 provided therein which is normally in contact with the terminal end of conductor C1 but which is spaced from conductor C2 when in a horizontal position as shown in FIG. 5. As rainfall is collected within the receptacle 25, the float 36 will begin to rise from a first position shown in full line in FIGS. 2 and 3 to a second position shown in dotted line in FIG. 2. When the float reaches the second position, the angle of the mercury contact switch will be such as to cause the pool of mercury 50 to make simultaneous engagement with the terminal ends of conductors C1 and C2 thereby completing an electrical circuit to the motor control switch S. Once the circuit has been completed, the power to the motor will be automatically terminated by any one of a number of conventional electronic configurations. Where the motor is an electric motor, the switch S may be a simple on/off switch whereas if the motor is an internal combustion engine, then the switch S may be a grounding switch to deactivate or interrupt electrical current flow to the ignition or spark components of the engine assembly. It should be noted that the mercury switch of the present invention may be otherwise constructed so as to normally form a closed contact within the first position and creating an open contact within the second position by simply redefining the placement of the mercury within the switch. In either case, the mercury switch may be utilized to either open or close circuits to terminate the operation of the motor unit in response to a predetermined amount of liquid being received within the receptacle 25.

As noted with respect to FIG. 2 of the drawings, when the bracket assembly is mounted within the lower pair of openings shown at 40', the remaining openings 40 spaced above the bracket provide fluid outlets which enable rain water to be discharged therethrough as the level increases within the receptacle 25. It is an object of the present invention to insure that the buildup or collection of water within the receptacle 25 does not exceed a level which would cause the water to flow over the float switch 45. Therefore, once the float switch has reached the second dotted line position as shown in FIG. 3, the water level within the receptacle will be prohibited from rising to the second position as it is discharged through the remaining openings 40 spaced above the bracket 38.

In addition to providing fluid outlets, the openings 40 also provide a means for enabling the electrical switch to be adjusted so as to be activated for selective amounts of rain water being collected within receptacle 25. In this respect, if the bracket assembly shown in FIG. 2 were to be raised and secured through the intermediate set of openings shown at 40, then the float 36 would be placed at a higher level within the receptacle. In this situation, the switch 45 would not be activated until a greater amount of rainfall had occurred. By providing additional pairs of openings in the side wall 30, and by varying the vertical spacing between such openings, the switch 45 can be predetermined to be operable for any given amount of naturally occurring rain falling in the area.

Due to providing openings in the side wall, the base portion 41 of the bracket is enlarged so that as the bracket assembly is raised relative to side wall 30, the bottom or lower portion of the bracket as shown in FIG. 3 will extend over the lower openings below the bracket assembly and effectively forms a seal to prevent fluid from discharging from any openings below the fastening elements 39. In this manner, the integrity of the system is insured. In some embodiments, it may be desired to provide a rubber gasket between the base plate 41 and the side wall 30 of the receptacle to insure a fluid tight relationship therebetween when the unit is in use.

It should be noted that although the adjustable mounting of the float and switch 45 of the present invention has been disclosed using openings through the side walls, the same type of adjustment may be utilized using a track configuration in which the bracket may be slidingly engaged. Other configurations may also be utilized to vertically adjust the bracket assembly or the float assembly vertically with respect to the side walls of the receptacle. In any case, however, openings must be provided or other fluid discharge conduits placed within the container to insure that the fluid level does not build up above the level of the switch 45 when it is pivoted into its second position as shown in FIG. 2 of the drawings.

In yet another embodiment of the invention and to insure that the fluid level in the receptacle does not exceed a predetermined value, a separate discharge valve 50 may be provided through the lower wall 26 of the receptacle as shown in FIG. 2. The valve 50 is operable so as to open in response to a predetermined amount of fluid pressure which is directly related to the height of the rain water contained within the receptacle 25. In addition, the valve assembly can be of the type which provides a continuous opening to drain the receptacle after a given pressure is initially reached or a given height of liquid within the container is initially established. In this manner, the valve 50 can permit the container to be automatically drained after the fluid level has reached a height at which switch 45 has been raised to its second position as shown in FIG. 2. In such an embodiment, the circuit to the control switch S of the pump and motor unit 11 would be such that the movement of the switch 45 to its first position would not reengage or restart the motor.

Figure 4:
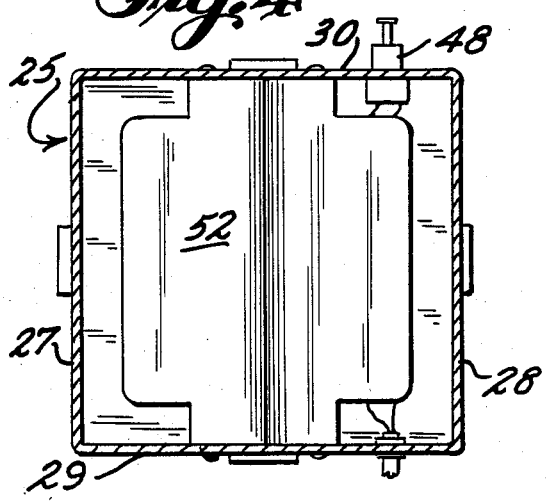
FIG. 4 is a cross sectional view taken along lines 4—4 of FIG. 1.

In order to protect the float or liquid level switch 45 and the contacts between the various conductors and the switch 48 and switch 45, a baffle assembly 52 is mounted intermediate the screen or sieve 33 and the switches 48 and 45 a shown in FIGS. 2 and 3. The baffle is shown as extending between side walls 29 and 30 and being secured thereto by suitable fastening elements 53. The baffle, however, is spaced from side walls 27 and 28 as shown in FIGS. 2 and 4 so as to permit a space in which the incoming rain may be channeled to the bottom of the receptacle 25 without being deposited or flowing onto the electrical plate or without directly impacting upon the float 36. One of the additional purposes of the baffle 52 is to insure that water currents are not deposited or directed against the float 36 so that the float will continue to rise uniformly without being adversely effected by the incoming rain water but will only be responsive to the collection of water in the bottom of the receptacle. Further, the baffle 52 provides a wind gust distributor and will prevent the direct impact of any forceful winds directly against the components such as the float which might otherwise adversely effect the movement of the float relative to the buildup of fluid within the receptacle.

The control assembly housing or receptacle 25 is preferably formed of a plastic material with the various bracket and support plates components also being formed of a non-corrosible plastic or metallic material. By providing non-corrosive materials, the components of the present invention can operate over a period of years without any adverse effect from the water being collected therein.

In the use of the control switch of the present invention, once it is determined how much rainfall is necessary for a given crop under the specific climatic conditions for the area, the bracket assembly 38 may be selectively secured in an appropriately mounted position to the side wall 30 of the container. By raising the bracket assembly relative to the side wall, a higher amount of natural rainfall will be necessary in order to terminate power to the pump and motor unit 11. In a like manner, if the bracket assembly is lowered with respect to the side wall, then the switch 45 will be activated when a lesser amount of rainfall has occurred thereby terminating the operation of the motor and pump control unit for the irrigation system. Once an appropriate height setting has been determined, the manual on/off switch 48 is placed into an on contact position and the unit thereafter monitors rainfall naturally occurring in the vicinity. As the rainfall continues, the rain will pass into the receptacle 25 being directed by baffle assembly 52 so as not to interfere with the float or switch 36 and 45, respectively. As the level of water in the receptacle 25 builds up, the float will be moved from its first to an upper second position at which time the mercury switch 45 will either make or break contact depending upon the specific arrangement thereby either opening or closing the circuit to the control switch S of the motor. In either case, the control switch is operable to stop further operation of the motor thereby preventing further irrigation from surface or subsurface sources and effectively conserving precious surface and subsurface water supplies. As the rain continuous, the rain will be discharged through the spaced vertical openings 40 in the side wall of the housing thereby preventing the building of water within the housing to a level which would overflow the switch 45.

As an alternate embodiment, the valve 50 may be constructed as a siphoning valve. The purpose of this valve would be to provide a continuous but slow discharge of fluid from the receptacle which discharge would directly relate to the general percolation rate of water through the soil in the area in which the switch device is utilized. By adjusting the valve 50, water can be caused to flow from the receptacle at approximately the same rate that it would flow if the water had been absorbed into the ground. In this manner, the switch control device of the present invention can be utilized to monitor accumulated amounts of rainfall over given periods of time. Therefore, if only a small amount of rain falls a first day, a portion of that rainfall will be allowed to dissipate from the receptacle in a manner similar to the water which would have been absorbed into the ground and evaporated into the air. However, any amounts remaining are accumulated with rainfall from a second day and, in this manner, small amounts of rain which would otherwise not effect the operation of the switch 45 are accumulated over a period of time with the result that should sufficient rainfall be detected over any given period, the switch 45 will be actuated to prohibit additional irrigation.

I claim:

1. A control device for shutting off the motor which drives a pump for an irrigation system in response to a predetermined amount of rainfall thereby terminating the supply of water to at least one distribution outlet comprising a receptacle having upper and lower ends and side wall portions defining an enclosed chamber, an opening in said upper end of said receptacle, a float means disposed within said housing, mounting means for pivotally supporting said float means within said receptacle, said float means being pivotable from a first position to a second position as fluids are collected within said receptacle, securing means for selectively vertically adjusting the position of said mounting means with respect to said receptacle, first electrical switch means carried by said float means, electrical conductor means connecting said first electrical switch means to the motor, said first electrical switch means being operable when said float means is in said second position to shut down the motor to thereby prevent further operation of the pump in response to a predetermined accumulation of rain water within said receptacle.

2. The control device of claim 1 in which said electrical switch is a mercury switch having spaced normally open contacts when said float means is in said first position, said contacts being closed upon said float means pivoting to said second position so as to complete an electrical circuit therethrough.

3. The control device of claim 1 including a cover mounted to said upper end of said receptacle, said cover including a strainer means for permitting rain to pass therethrough into said chamber while preventing the passage of debris into said chamber.

4. The control device of claim 3 including a baffle plate mounted within said receptacle and intermediate said strainer means and said first electrical switch means, said baffle plate being of a size to overlay said first electrical switch means so as to deflect water from said first electrical switch means as the rain water is collected within said chamber.

5. The control device of claim 1 including means for discharging fluids from within said chamber after said float means has been pivoted to said second position so as to prevent and further increase in the accumulation of rain water within said chamber.

6. The control device of claim 5 including valve means mounted through said receptacle, said valve means being selectively adjustable so as to open to drain water accumulated within said receptacle after the water has raised said float means to said second position.

7. The control device of claim 5 in which said means for discharging fluids include at least two vertically spaced openings through said side walls of said receptacle.

8. The control device of claim 7 in which said securing means includes at least one fastening element extendable through said openings in said side walls of said receptacle, said fastening element being selectively engageable to said mounting means whereby said mounting means may be secured in various vertical positions relative to said receptacle.

9. The control device of claim 8 in which said mounting means includes a bracket assembly having a base plate and a pair of outwardly extending flange elements, a pivotable plate supported between said flange elements, said float means being secured to said pivotable plate.

10. The control device of claim 9 in which said base plate is of a size to cover any of said openings in said side walls which are vertically spaced below said securing means to thereby prevent the passage of fluids therethrough.

11. The control device of claim 1 including a second electrical switch means mounted to said receptacle, said second electrical switch means being connected in series with said first switch means through said electrical conductor means whereby said second electrical switch means may be used to selectively open and close the circuit to said first electrical switch means.

12. The control device of claim 1 including a stand, said stand including a vertically oriented ground engaging support having a lower tapered end and an upper end, and retainer means mounted to said upper end to selectively receive said receptacle therein whereby said receptacle may be selectively supported in spaced relationship from the ground.

13. The control device of claim 1 including valve means mounted through said receptacle, said valve means being selectively adjustable to drain water from within said receptacle at a predetermined rate.

14. A control device for shutting off the motor which drives a pump from an irrigation system in response to a predetermined amount of rainfall for supplying water to at least one distribution outlet comprising a receptacle having upper and lower ends and side wall portions defining an enclosed chamber, an opening in said upper end of said receptacle, a float means disposed within said housing, mounting means for pivotally supporting said float means within said receptacle, said float means being pivotable from a first position to a second position as fluids are collected within said receptacle, a plurality of vertically spaced openings through said side walls of said receptacle, at least one fastening element extendable through said openings in said side walls of said receptacle, said fastening elements being selectively engageable to said mounting means whereby said mounting means may be secured in various vertical positions relative to said receptacle, first electrical switch means carried by said float means, electrical conductor means connecting said first electrical switch means to the motor, said first electrical switch means being operable when said float means is in said second position to shut down the motor to thereby prevent further operation of the pump apparatus in response to a predetermined accumulation of rain water within said receptacle.

15. The control device of claim 14 including a cover mounted to said upper end of said receptacle, said cover including a strainer means for permitting rain to pass therethrough into said chamber while preventing the passage of debris into said chamber.

16. The control device of claim 15 including a baffle plate mounted within said receptacle and intermediate said strainer means and said first electrical switch means, said baffle plate being of a size to overlay said first electrical switch means so as to deflect water from said first electrical switch means as the rain water is collected within said chamber.

17. The control device of claim 16 in which said mounting means includes a bracket assembly having a base plate and a pair of outwardly extending flange elements, a pivotable plate supported between said flange elements, said float means being secured to said pivotable plate.

18. The control device of claim 16 in which said electrical switch is a mercury switch having spaced normally open contacts when said float means is in said first position, said contacts being closed upon said float means pivoting to said second position so as to complete an electrical circuit therethrough.

19. The control device of claim 16 including a second switch means mounted to said receptacle, said second switch means being connected in series with said first switch means through said electrical conductor means whereby said second switch means may be used to selectively open and close the circuit to said first switch means.

20. The control device of claim 19 including a stand, said stand including a vertically oriented ground engaging support having a lower tapered end and an upper end, and retainer means covered by said upper end to selectively receive said receptacle therein whereby said receptacle may be selectively supported in spaced relationship from the ground.

* * * * *